(12) United States Patent
Eo et al.

(10) Patent No.: US 10,183,571 B2
(45) Date of Patent: Jan. 22, 2019

(54) TRANSMISSION FOR HYBRID VEHICLE

(71) Applicant: Hyundai Motor Company, Seoul (KR)

(72) Inventors: Soon Ki Eo, Ansan-si (KR); Sun Sung Kwon, Anyang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 335 days.

(21) Appl. No.: 15/299,195

(22) Filed: Oct. 20, 2016

(65) Prior Publication Data

US 2018/0001760 A1  Jan. 4, 2018

(30) Foreign Application Priority Data

Jun. 30, 2016 (KR) .......................... 10-2016-0082281

(51) Int. Cl.
| | |
|---|---|
| *F16H 3/085* | (2006.01) |
| *B60K 6/26* | (2007.10) |
| *B60K 6/383* | (2007.10) |
| *B60K 6/547* | (2007.10) |
| *B60K 6/36* | (2007.10) |

(Continued)

(52) U.S. Cl.
CPC ................ *B60K 6/547* (2013.01); *B60K 6/36* (2013.01); *B60K 6/48* (2013.01); *F16H 3/006* (2013.01); *F16H 3/085* (2013.01); *F16H 3/089* (2013.01); *F16H 3/10* (2013.01); *B60K 2006/4816* (2013.01); *B60K 2006/4825* (2013.01); *B60Y 2200/92* (2013.01); *B60Y 2400/70* (2013.01);

(Continued)

(58) Field of Classification Search
CPC .. F16H 3/08; F16H 3/085; B60K 6/20; B60K 6/22; B60K 6/38; B60K 6/383

USPC .......................... 74/330, 331, 333, 340, 661
See application file for complete search history.

(56) References Cited

U.S. PATENT DOCUMENTS

| | | | |
|---|---|---|---|
| 9,341,239 B2 * | 5/2016 | Lee ........................... | F16H 3/08 |
| 9,568,066 B2 * | 2/2017 | Yang ....................... | F16H 3/006 |

(Continued)

FOREIGN PATENT DOCUMENTS

| | | |
|---|---|---|
| JP | 2009-154610 A | 7/2009 |
| JP | 2009-292207 A | 12/2009 |

(Continued)

OTHER PUBLICATIONS

Korean Office Action dated Sep. 26, 2017 form the corresponding Korean Application No. 10-2016-0082281, 5 pp.

*Primary Examiner* — Ha Dinh Ho
(74) *Attorney, Agent, or Firm* — Brinks Gilson & Lione

(57) ABSTRACT

The present disclosure provides a transmission for a hybrid vehicle, including a main clutch and a sub-clutch which are disposed on a first input shaft and a second input shaft to selectively transfer power from an engine to an output shaft. First and second pairs of engine-side gears having different gear ratios are meshed with the sub-clutch and the output shaft and with the second input shaft and the output shaft, such that a pair of gears is selected. A third input shaft rotates using power received from a motor. A plurality of pairs of motor-side gears having different gear ratios are meshed with the third input shaft and the output shaft, such that a pair of gears appropriate to the speed of the vehicle is selected by a motor-side engaging/disengaging unit. A one-way clutch allows power to be only transferred from the third input shaft to the output shaft.

11 Claims, 3 Drawing Sheets

(51) Int. Cl.
*B60K 6/48* (2007.10)
*F16H 3/00* (2006.01)
*F16H 3/089* (2006.01)
*F16H 3/10* (2006.01)

(52) U.S. Cl.
CPC ... *F16H 2200/0043* (2013.01); *Y10S 903/909* (2013.01); *Y10S 903/919* (2013.01)

(56) References Cited

U.S. PATENT DOCUMENTS

| | | | |
|---|---|---|---|
| 9,889,734 B2* | 2/2018 | Yang | B60K 6/36 |
| 2010/0031910 A1* | 2/2010 | Seufert | B60K 6/387 |
| | | | 123/179.3 |
| 2011/0265601 A1* | 11/2011 | Pastorello | B60K 6/48 |
| | | | 74/661 |
| 2012/0303201 A1* | 11/2012 | Tsuneishi | B60K 6/547 |
| | | | 701/22 |
| 2016/0082822 A1* | 3/2016 | Huh | B60K 6/36 |
| | | | 74/665 R |

FOREIGN PATENT DOCUMENTS

| | | |
|---|---|---|
| JP | 2012-240624 A | 12/2012 |
| KR | 10-2003-0032429 A | 4/2003 |
| KR | 10-2009-0132758 A | 12/2009 |
| KR | 10-2012-0055335 A | 5/2012 |
| KR | 10-2013-0013283 A | 2/2013 |
| KR | 10-1500205 B1 | 3/2015 |
| KR | 10-2015-0060061 A | 6/2015 |
| KR | 10-2015-0071606 A | 6/2015 |
| KR | 10-2016-0046424 A | 4/2016 |
| KR | 10-2016-0066652 A | 6/2016 |
| WO | 2011-0136235 A1 | 11/2011 |

* cited by examiner

FIG. 3

[Up-Shift]

| Shift Positions | CL_MN | CL_SB | S2&4 | | | SL&H | | | S1-1 | |
|---|---|---|---|---|---|---|---|---|---|---|
| | | | 2nd | N | 4th | Low | N | High | N | Low |
| R | - | - | | ● | | ● | | | ● | |
| N | - | - | | ● | | | ● | | ● | |
| 1 | - | - | | ● | | | ● | | | ● |
| 2 | ● | - | ● | | | | ● | | ● | |
| 3 | - | ● | | ● | | | ● | | ● | |
| 4 | ● | - | | | ● | | ● | | ● | |
| 5~ | - | - | | ● | | | | ● | ● | |

FIG. 4

[Down-Shift]

| Shift Postions | CL_MN | CL_SB | S2&4 | | | SL&H | | | S1-1 | |
|---|---|---|---|---|---|---|---|---|---|---|
| | | | 2nd | N | 4th | Low | N | High | N | Low |
| 5~ | - | - | | ● | | | | ● | ● | |
| 4 | ● | - | | | ● | | ● | | ● | |
| 3 | - | ● | | ● | | | ● | | ● | |
| 2 | ● | - | ● | | | | ● | | ● | |
| 1 | - | - | | ● | | ● | | | ● | |
| N | - | - | | ● | | | ● | | ● | |
| R | - | - | | ● | | ● | | | ● | |

TRANSMISSION FOR HYBRID VEHICLE

CROSS REFERENCE TO RELATED APPLICATION

The present application claims priority to and the benefit of Korean Patent Application No. 10-2016-0082281, filed Jun. 30, 2016, the entire contents of which are incorporated herein by reference.

FIELD

The present disclosure relates to a transmission for a hybrid vehicle to improve the fuel efficiency and market competitiveness of the hybrid vehicle.

BACKGROUND

The statements in this section merely provide background information related to the present disclosure and may not constitute prior art.

An automated manual transmission provides driving convenience similar to that provided by automatic transmissions by allowing gears to be automatically changed by actuators while a vehicle is cruising. Automated manual transmissions can contribute to improvements in fuel efficiency since the power transmission efficiencies thereof are better than those of automatic transmissions.

Automated manual transmissions include hydraulic actuators used in manual transmissions, whereby a process of changing gears by controlling gears can be automatically performed by a transmission control unit (TCU) instead of being manually performed by a driver.

However, the automated manual transmission based on a synchromesh shifting mechanism inevitably involves a moment at which the supply of power from an engine is stopped while gear shifting is being automatically performed by the actuator. The momentary power stop causes decrease in torque, which deteriorates the sensation of shifting. In particular, a driver experiences a phenomenon as if a vehicle is pulled backward.

SUMMARY

Accordingly, the present disclosure provides a transmission for a hybrid vehicle, the transmission improving the fuel efficiency and market competitiveness of the hybrid vehicle using a motor in the low-efficiency driving range of an engine.

According to one aspect of the present disclosure, a transmission for a hybrid vehicle may include: a main clutch and a sub-clutch disposed on a first input shaft and a second input shaft, respectively, to selectively transfer power from an engine to an output shaft through coupling and decoupling operations; an engine-side shift unit including at least one first pair of engine-side gears meshed with the sub-clutch and the output shaft and at least one second pair of engine-side gears meshed with the second input shaft and the output shaft, the gear ratio of the first pair of engine-side gears being different from the gear ratio of the second pair of engine-side gears, such that a pair of gears appropriate to a speed of a vehicle is selected by an engine-side engaging/disengaging unit; a third input shaft rotating using power received from a motor; a motor-side shift unit including a plurality of pairs of motor-side gears having different gear ratios meshed with the third input shaft and the output shaft, such that a pair of gears appropriate to the speed of the vehicle is selected by a motor-side engaging/disengaging unit; and a one-way clutch disposed on a path along which power is transferred from the motor to the output shaft, such that power is only transferred from the third input shaft in a direction to the output shaft.

The first input shaft and the second input shaft may be arranged coaxially. The second input shaft may include a hollow shaft to accommodate the first input shaft therein. The main clutch may be disposed on one end of the second input shaft that is closer to the engine than the other end of the second input shaft. The sub-clutch may be disposed on one end of the first input shaft that is more remote from the engine than the other end of the first input shaft.

The output shaft may include a first output shaft and a second output shaft arranged in parallel to the first input shaft and the second input shaft. The engine-side shift unit may include the at least one first pair of engine-side gears meshed with the sub-clutch and the first output shaft and the at least one second pair of engine-side gears meshed with the second input shaft and the second output shaft.

The engine-side shift unit may further include: a power transfer input gear disposed on the second output shaft; a power transfer output gear disposed on the first output shaft; and a power transfer idling gear meshed between the power transfer input gear and the power transfer output gear.

The power transfer output gear may include an output gear of the first pair of engine-side gears meshed with the sub-clutch and the first output shaft.

The first pair of engine-side gears meshed with the sub-clutch and the first output shaft may be one pair of odd-numbered gears among a plurality of pairs of odd-numbered gears, except for a pair of lowest gears. The second pair of engine-side gears meshed with the second input shaft and the second output shaft may be a plurality of pairs of even-numbered gears.

The motor-side shift unit may include a pair of lower gears and a pair of higher gears meshed with the third input shaft and the first output shaft. The one-way clutch may allow power to be only transferred from the pair of lower gears in a direction to the first output shaft.

The transmission may further include a synchronization unit allowing an output gear of the pair of lower gears to be selectively coupled to the first output shaft. The one-way clutch may be disposed between the synchronization unit and the first output shaft.

The first pair of engine-side gears meshed with the sub-clutch and the output shaft may include one pair of odd-numbered gears among a plurality of pairs of odd-numbered gears, except for a pair of lowest gears. The second pair of engine-side gears meshed with the second input shaft and the output shaft may include a plurality of pairs of even-numbered gears.

The motor-side shift unit may include a pair of lower gears and a pair of higher gears meshed with the third input shaft and the output shaft. The one-way clutch may allow power to be only transferred from the pair of lower gears to the output shaft.

The transmission may further include a synchronization unit allowing an output gear of the pair of lower gears to be selectively coupled to the output shaft. The one-way clutch may be disposed between the synchronization unit and the output shaft.

According to the present disclosure, it is possible to drive a vehicle using the motor from a stopped state, in a low-speed driving range, or in a high-speed driving range. It is thereby possible to improve the fuel efficiency and market competitiveness of a hybrid vehicle using the motor in a low-efficiency driving range of the engine. In addition, at a shifting point of the low-speed driving range in which the driving of the motor is converted into the driving of the engine, a change in torque is absorbed to the one-way clutch to remove the sensation of interruption of torque, thereby improving the sensation of shifting.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3 is a table representing shifting operations at respective shift positions in the case of upshifting using the transmission according to the present disclosure; and FIG. 4 is a table representing shifting operations at respective shift positions in the case of downshifting using the transmission according to the present disclosure.

Figure 1:
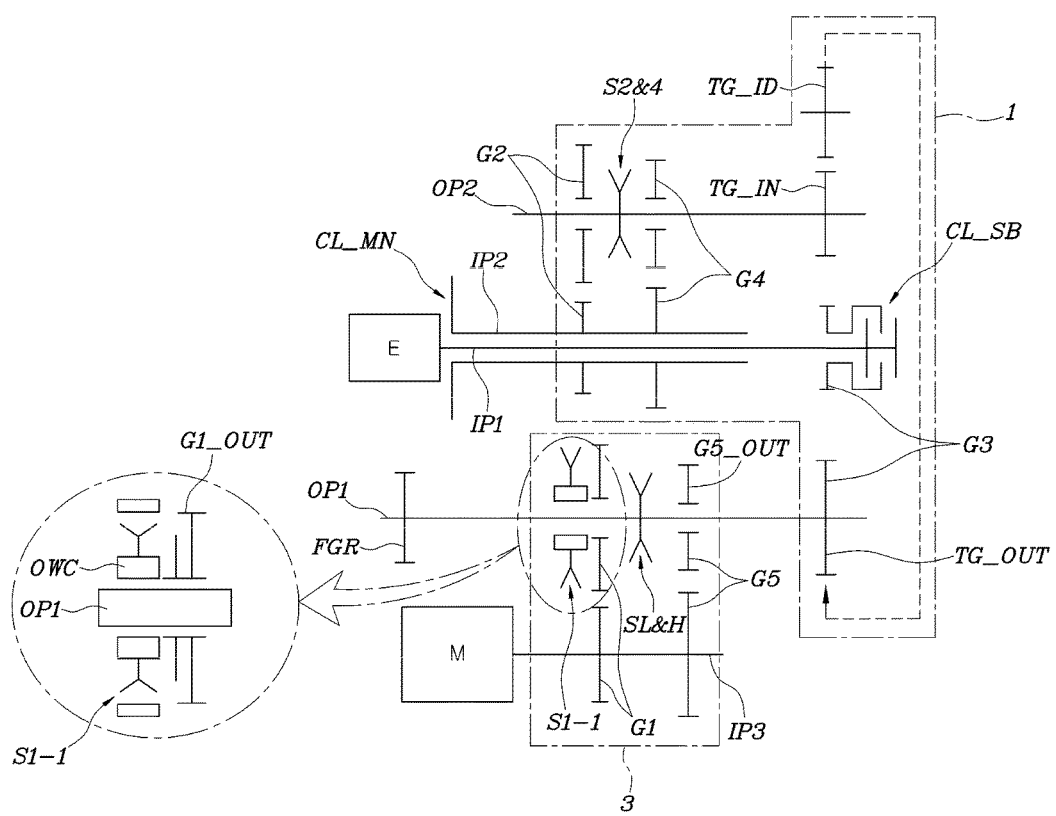
FIG. 1 is a schematic diagram illustrating a first exemplary form of a transmission for a hybrid vehicle according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring FIG. 1, a transmission for a hybrid vehicle according to the present disclosure generally includes a first input shaft IP1, a second input shaft IP2, a main clutch CL_MN, a sub-clutch CL_SB, an engine-side shift unit 1, a third input shaft IP3, a motor-side shift unit 3, and a one-way clutch OWC.

The transmission will be described in detail with reference to FIGS. 1 and 2. The main clutch CL_MN is provided on the second input shaft IP2 to selectively transfer power from an engine E to an output shaft OP in response to selective coupling and decoupling operations of the main clutch CL_MN.

The sub-clutch CL_SB is provided on the first input shaft IP1 to selectively transfer power from the engine E to the output shaft OP in response to selective coupling and decoupling operations of the sub-clutch CL_SB.

For example, the first input shaft IP1 and the second input shaft IP2 may be arranged coaxially, or the second input shaft IP2 may be implemented as a hollow shaft to accommodate the first input shaft IP1 therein.

The main clutch CL_MN may be disposed on one end of the second input shaft IP2 that is closer to the engine E than the other end of the second input shaft IP2. In addition, the sub-clutch CL_SB may be disposed on an end of the first input shaft IP1, i.e. the opposite side of the engine E (a rear portion of the transmission), that is more remote from the engine E than the other end of the first input shaft IP1. Here, the engine E is coupled to one end of the first input shaft IP1 directly or via a damper, such that the first input shaft IP1 can be rotated by power from the engine E.

The engine-side shift unit 1 includes a plurality of pairs of engine-side gears having different gear ratios, which are meshed with the sub-clutch CL_SB, the second input shaft IP2 and a second output shaft OP2, such that a pair of gears appropriate to the speed of a vehicle can be selected by an engine-side engaging/disengaging unit.

For example, the engine-side engaging/disengaging unit may be provided between two pairs of gears to select one pair of gears therefrom. The engine-side engaging/disengaging unit may be implemented as a device for allowing and disallowing the transmission of power. The engine-side engaging/disengaging unit can be selected from among, but not limited to, a synchromesh-type synchronizing device, a dog clutch, a modified dog clutch, a dry/wet clutch, an electric/electronic dry/wet magnet clutch, a coupling, a fluid clutch, and a spline-based coupling structure.

The third input shaft IP3 is able to rotate using power received from the motor M. The third input shaft IP3 is disposed parallel to the first input shaft IP1 and the second input shaft IP2. The motor M can be directly connected to the third input shaft IP3.

The motor-side shift unit 3 includes a plurality of pairs of motor-side gears having different gear ratios meshed with the third input shaft IP3 and a first output shaft OP1, such that a pair of gears appropriate to the speed of a vehicle can be selected by a motor-side engaging/disengaging unit.

For example, the motor-side engaging/disengaging unit may be provided between two pairs of gears to select one pair of gears therefrom. The motor-side engaging/disengaging unit may be implemented as a device for allowing and disallowing the transmission of power, and the motor-side engaging/disengaging unit may be selected from among, but not limited to, a synchromesh-type synchronizing device, a dog clutch, a modified dog clutch, a dry/wet clutch, an electric/electronic dry/wet magnet clutch, a coupling, a fluid clutch, and a spline-based coupling structure.

The one-way clutch OWC may be provided on a path along which power is transferred from the motor M to the first output shaft OP1, such that power is only transferred in a direction from the third input shaft IP3 to the first output shaft OP1.

Here, the one-way clutch OWC for mechanically allowing and disallowing the transmission of power may be implemented as one selected from, but is not limited to, a mechanical device operating in the same principle as described above, a part operating using hydraulic force, a fluid-machine composite structure device, a device using electric/electronic force, and so on.

According to the above-described configuration, it is possible to drive the vehicle using the motor M in a stopped state, in a low-speed driving range, or in a high-speed driving range. It is thereby possible to improve the fuel efficiency and market competitiveness of the hybrid vehicle using the motor M in a low-efficiency driving range of the engine E.

In addition, at a shifting point of the low-speed driving range in which the driving of the motor M is converted into the driving of the engine E, a change in torque is absorbed to the one-way clutch OWC to remove the interruption of torque, thereby improving the shifting quality.

FIG. 1 illustrates a first exemplary form of the transmission for a hybrid vehicle, in which the output shaft OP may include a first output shaft OP1 and a second output shaft OP2.

For example, the first output shaft OP1 and the second output shaft OP2 are arranged in parallel to the first input shaft IP1 and the second input shaft IP2.

According to this form, the plurality of pairs of engine-side gears provided on the engine-side shift unit 1 may include one or more pairs of gears meshed with the sub-clutch CL_SB and the first output shaft OP1 and one or more pairs of gears meshed with the second input shaft IP2 and the second output shaft OP2.

In detail, the pair of engine-side gears meshed with the sub-clutch CL_SB and the first output shaft OP1 is one pair of odd-numbered gears among a plurality of pairs of odd-numbered gears, except for a pair of lowest gears. According to the present disclosure, this pair of gears may be a pair of third gears G3. The pair of third gears G3 may be selected through the coupling operation of the sub-clutch CL_SB.

Since an input gear provided in the pair of third gears G3 is directly connected to the sub-clutch CL_SB, a third shift position may be established by selecting the pair of third gears G3 through the coupling operation of the sub-clutch CL_SB.

In addition, the pair of engine-side gears meshed with the second input shaft IP2 and the second output shaft OP2 includes a plurality of pairs of even-numbered gears. According to the present disclosure, a pair of second gears G2 and a pair of fourth gears G4 may be meshed with the second input shaft IP2 and the second output shaft OP2, respectively. A second-and-fourth position shifting unit S2&4 may be provided between the pair of second gears G2 and the pair of fourth gears G4 to select one pair of gears therefrom.

Furthermore, according to the first form, the first output shaft OP1 includes a following reduction gear FGR connected to a differential. In this regard, a component for transferring power from the second output shaft OP2 to the first output shaft OP1 may be further provided.

For example, a power transfer input gear TG_IN is disposed on the second output shaft OP2, and a power transfer output gear TG_OUT is disposed on the first output shaft OP1. In addition, a power transfer idling gear TG_ID is meshed between the power transfer input gear TG_IN and the power transfer output gear TG_OUT.

Specifically, driving force E supplied to the second output shaft OP2 may be transferred to the following reduction gear FGR which is disposed on the first output shaft OP1 through the power transfer input gear TG_IN, the power transfer idling gear TG_ID, and the power transfer output gear TG_OUT.

Here, the power transfer output gear TG_OUT may be an output gear of the pair of engine-side gears meshed with the sub-clutch CL_SB and the first output shaft OP1. According to the first form, the output gear of the pair of third gears G3 may be used as the power transfer output gear TG_OUT.

Referring to FIG. 1, the motor-side shift unit 3 includes a pair of lower gears G1 and a pair of higher gears G5.

For example, the pair of lower gears G1 and the pair of higher gears G5 may be meshed with the third input shaft IP3 and the first output shaft OP1.

Here, the motor-side engaging/disengaging unit may be provided between an output gear G1_OUT provided in the pair of lower gears G1 and an output gear G5_OUT provided in the pair of higher gears G5. The pair of lower gears G1 may be a pair of first gears, and the pair of higher gears G5 may be a pair of fifth gears. The motor-side engaging/disengaging unit may be a first-and-fifth position shifting unit SL&H.

In addition, the pair of higher gears G1 may be used as a pair of power-generating gears, in which the motor M may function as a generator. Although the motor M may be a motor generator able to perform both a rotating function unique to the motor and a generator function, the term "motor" is used herein for the sake of clarity.

Furthermore, the one-way clutch OWC may be provided only to transfer power from the pair of lower gears G1 in the direction to the first output shaft OP1.

For example, a synchronization unit S1-1 allowing the output gear G1_OUT of the pair of lower gears G1 to be selectively coupled to the first output shaft OP1 may be provided. In this regard, the one-way clutch OWC may be disposed between the synchronization unit S1-1 and the first output shaft OP1. In one form, the outer wheel of the one-way clutch OWC is fixed to the synchronization unit S1-1 while the inner wheel of the one-way clutch OWC is fixed to the first output shaft OP1.

That is, the output gear G1_OUT of the pair of lower gears G1 may be coupled to the first output shaft OP1 via the synchronization unit S1-1.

Figure 2:
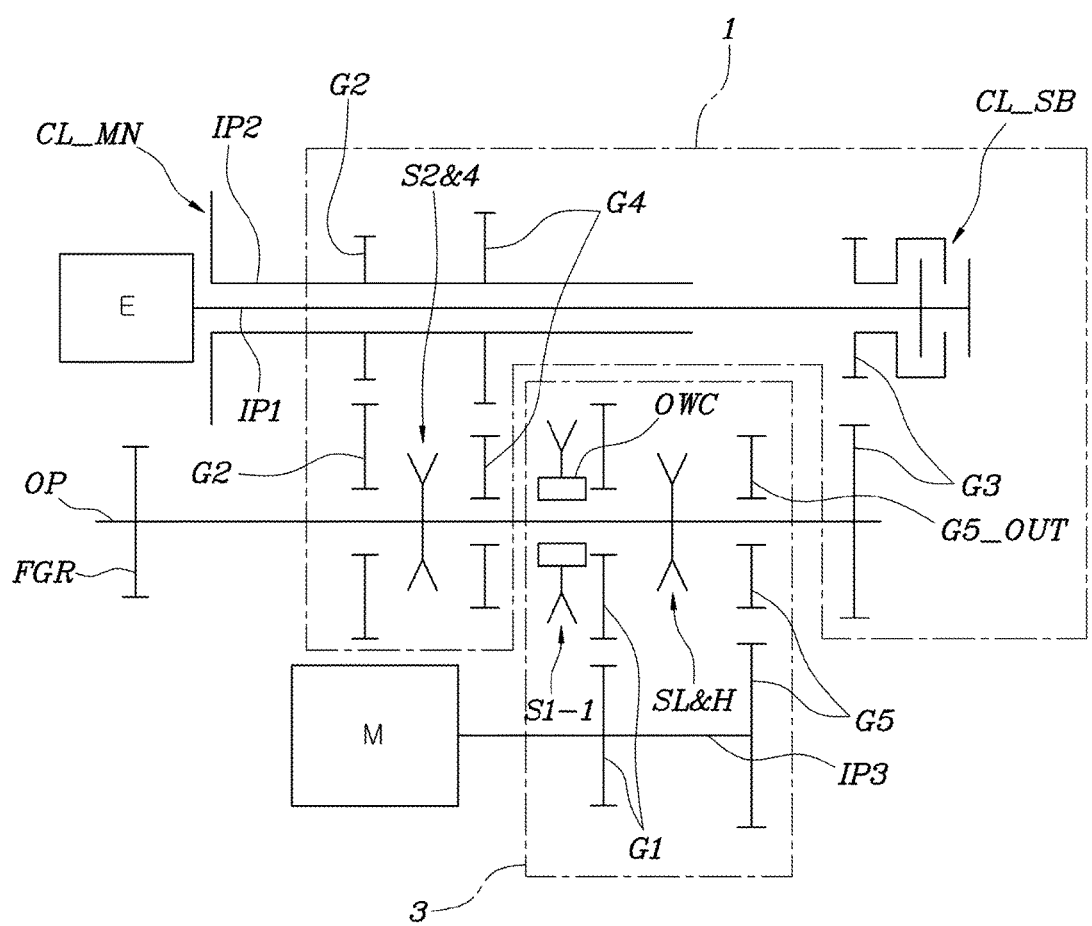
FIG. 2 is a schematic diagram illustrating a second exemplary form of the transmission for a hybrid vehicle according to the present disclosure.

In addition, FIG. 2 illustrates the configuration of a second exemplary form of the transmission for a hybrid vehicle according to the present disclosure. The output shaft OP is arranged in parallel to the first input shaft IP1 and the second input shaft IP2.

According to this configuration, the plurality of pairs of engine-side gears provided on the engine-side shift unit 1 may include one or more pairs of gears meshed with the sub-clutch CL_SB and the output shaft OP and one or more pairs of gears meshed with the second input shaft IP2 and the output shaft OP.

Describing more specifically, in the pairs of engine-side gears, one pair of odd-numbered gears, except for a pair of lowest gears, is meshed with the sub-clutch CL_SB and the first output shaft OP1. According to the present disclosure, this pair of gears may be the pair of third gears G3. The pair of third gears G3 may be selected through the coupling operation of the sub-clutch CL_SB.

Since an input gear provided in the pair of third gears G3 is directly connected to the sub-clutch CL_SB, a third shift position may be established by selecting the pair of third gears G3 through the coupling operation of the sub-clutch CL_SB.

In addition, the pairs of engine-side gears include a plurality of pairs of even-numbered gears meshed with the second input shaft IP2 and the output shaft OP. The pair of second gears G2 and the pair of fourth gears G4 may be meshed with the second input shaft IP2 and the output shaft OP, respectively. The second-and-fourth position shifting unit S2&4 may be provided between the pair of second gears G2 and the pair of fourth gears G4 to select one pair of gears therefrom.

Furthermore, according to the second form, the following reduction gear FGR connected to a differential is provided on the output shaft OP.

Referring to FIG. 2, the motor-side shift unit 3 includes the pair of lower gears G1 and the pair of higher gears G5.

For example, pair of lower gears G1 and the pair of higher gears G5 may be meshed with the third input shaft IP3 and the output shaft OP.

Here, the motor-side engaging/disengaging unit may be provided between the output gear G1_OUT provided in the pair of lower gears G1 and the output gear G5_OUT provided in the pair of higher gears G5. The pair of lower gears G1 may be a pair of first gears, and the pair of higher gears G5 may be a pair of fifth gears. The motor-side engaging/disengaging unit may be the first-and-fifth position shifting unit SL&H.

The one-way clutch OWC may be provided only to transfer power from the pair of lower gears G1 in the direction to the output shaft OP.

For example, the synchronization unit S1-1 allowing the output gear G1_OUT of the pair of lower gears G1 to be selectively coupled to the output shaft OP may be provided. In this regard, the one-way clutch OWC may be disposed between the synchronization unit S1-1 and the output shaft OP.

In particular, the output gear G1_OUT of the pair of lower gears G1 may be coupled to the output shaft OP via the synchronization unit S1-1.

Hereinafter, a description will be made to shifting operations at specific shifting points using the transmission according to the present disclosure.

Referring to FIGS. 1 and 3, when a vehicle is operating in a first shift position, the synchronization unit S1-1 in which the one-way clutch OWC is disposed is operated to select the output gear G1_OUT of the pair of lower gears G1.

When the motor M is operated in this state, the one-way clutch OWC causes the output gear G1_OUT of the pair of lower gears G1 to rotate while pulling the first output shaft OP1, such that the vehicle can cruise in the first shift position using the driving force of the motor M.

Afterwards, in the case upshifting from the first shift position to a second shift position, the pair of second gears G2 is selected using the second-and-fourth position shifting unit S2&4, and the main clutch CL_MN is converted into a coupling position, whereby the vehicle can cruise in the second shift position using driving force from the engine E. At this time, at a point in time at which the main clutch CL_MN is converted into the coupling position, the speed of rotation of the engine E transferred to the first output shaft OP1 due to the gear ratio of the pair of second gears G2 is faster than the speed of rotation of the output gear G1_OUT of the pair of lower gears G1. The one-way clutch OWC absorbs the difference in the speed between the pairs of gears G1 and G2, thereby inhibiting or preventing interlocking.

In addition, in the case of cruising in second, third, and fourth positions, the vehicle cruises using driving force from the engine E. In particular, not only upshifting but also downshifting between the shift positions is performed by torque cross-controlling, such as cross-controlling in connection with reciprocal torque between the main clutch CL_MN and the sub-clutch CL_SB (in a manner similar to the dual clutch shifting of a dual clutch transmission). In other words, this means that when one of upshifting and downshifting is performed, torque in disengaged shift position is decreased while torque in engaged shift position is increased.

In the case of cruising at the fifth shift position, the vehicle cruises using driving force from the motor M. In the case of upshifting from the fourth shift position to the fifth shift position, the speed of the motor M is set to the speed of the engine E transferred to the first output shaft OP1 due to the gear ratio of the pair of fourth gears G4, the pair of higher gears G5 is selected using the first-and-fifth position shifting unit SL&H, and then the main clutch CL_MN is converted into a decoupled position, whereby the vehicle can cruise at the fifth shift position by controlling the motor M.

Referring to FIGS. 1 and 4, in the case of downshifting from the fifth shift position to the fourth shift position, the pair of fourth gears G4 is selected using the second-and-fourth position shifting unit S2&4 to set the speed of the motor M to the speed of the engine E transferred to the first output shaft OP1 due to the gear ratio of the pair of fourth gears G4, and then the first-and-fifth position shifting unit SL&H is released from the pair of higher gears G5 while the main clutch CL_MN is converted into a coupled position, whereby the vehicle can cruise at the fourth shift position using driving force from the engine.

In addition, in the case of downshifting from the second shift position to the first shift position, the speed of the motor M is set to the speed of the engine E transferred to the first output shaft OP1 due to the gear ratio of the pair of second gears G2, the pair of lower gears G1 is selected using the first-and-fifth position shifting unit SL&H, and then the main clutch CL_MN is converted into a decoupled position, whereby the vehicle can cruise at the first shift position by controlling the operation of the motor M.

Here, a reason why the pair of lower gears G1 is selected using the first-and-fifth position shifting unit SL&H will be described. When the pair of lower gears G1 is selected using the synchronization unit S1-1, the first output shaft OP1 rotates faster than the output gear G1_OUT of the pair of lower gears G1 due to the cruising characteristics of downshifting from the second shift position to the first shift position. Then, the one-way clutch OWC absorbs the difference in the speed. Consequently, power from the motor M is not transferred to the first output shaft OP1, i.e. the supply of power is stopped.

In this regard, the pair of lower gears G1 is selected using the first-and-fifth position shifting unit SL&H, such that the deceleration of the first output shaft OP1 can be controlled by controlling the motor M. It is therefore possible to rapidly decelerate the vehicle according to the first gear ratio.

According to the present disclosure as set forth above, it is possible to drive a vehicle using the motor M from a stopped state, in a low-speed driving range, or in a high-speed driving range. It is thereby possible to improve the fuel efficiency and market competitiveness of a hybrid vehicle using the motor M in a low-efficiency driving range of the engine E. In addition, at a shifting point of the low-speed driving range in which the driving of the motor M is converted into the driving of the engine E, a change in torque is absorbed to the one-way clutch OWC to remove the interruption of torque, thereby improving the shifting quality.

Although the exemplary forms of the present disclosure have been described for illustrative purposes, those skilled in the art will appreciate that various modifications, additions and substitutions are possible, without departing from the scope and spirit of the present disclosure.

What is claimed is:

1. A transmission for a hybrid vehicle, the transmission comprising:
   a main clutch and a sub-clutch disposed on a first input shaft and a second input shaft, respectively, and configured to selectively transfer power from an engine to an output shaft through coupling and decoupling operations;
   an engine-side shift unit comprising:
   at least one first pair of engine-side gears meshed with the sub-clutch and the output shaft; and
   at least one second pair of engine-side gears meshed with the second input shaft and the output shaft, wherein a gear ratio of the at least one first pair of the engine-side gears is different from a gear ratio of the at least one second pair of the engine-side gears, such that a pair of gears appropriate to a speed of a vehicle is selected by an engine-side engaging/disengaging unit;

a third input shaft configured to rotate using power received from a motor;

a motor-side shift unit comprising a plurality of pairs of motor-side gears having different gear ratios meshed with the third input shaft and the output shaft, such that a pair of gears appropriate to the speed of the vehicle is selected by a motor-side engaging/disengaging unit; and a one-way clutch disposed on a path along which power is transferred from the motor to the output shaft, such that the power is only transferred from the third input shaft in a direction to the output shaft.

2. The transmission according to claim 1, wherein
the first input shaft and the second input shaft are arranged coaxially,
the second input shaft comprises a hollow shaft to accommodate the first input shaft therein,
the main clutch is disposed on one end of the second input shaft that is closer to the engine than an other end of the second input shaft, and
the sub-clutch is disposed on an end of the first input shaft that is more remote from the engine than an other end of the first input shaft.

3. The transmission according to claim 1, wherein
the output shaft comprises a first output shaft and a second output shaft arranged in parallel to the first input shaft and the second input shaft, and
the engine-side shift unit comprises:
the at least one first pair of the engine-side gears meshed with the sub-clutch and the first output shaft, and
the at least one second pair of the engine-side gears meshed with the second input shaft and the second output shaft.

4. The transmission according to claim 3, wherein the engine-side shift unit further comprises:
a power transfer input gear disposed on the second output shaft;
a power transfer output gear disposed on the first output shaft; and
a power transfer idling gear meshed between the power transfer input gear and the power transfer output gear.

5. The transmission according to claim 4, wherein the power transfer output gear comprises an output gear of the at least one first pair of the engine-side gears meshed with the sub-clutch and the first output shaft.

6. The transmission according to claim 3, wherein
the at least one first pair of the engine-side gears meshed with the sub-clutch and the first output shaft comprises one pair of odd-numbered gears among a plurality of pairs of odd-numbered gears, except for a pair of lowest gears, and
the at least one second pair of the engine-side gears meshed with the second input shaft and the second output shaft comprises a plurality of pairs of even-numbered gears.

7. The transmission according to claim 3, wherein
the motor-side shift unit comprises a pair of lower gears and a pair of higher gears meshed with the third input shaft and the first output shaft, and
the one-way clutch is configured to transfer power only from the pair of the lower gears in a direction to the first output shaft.

8. The transmission according to claim 7, further comprising a synchronization unit configured to selectively couple an output gear of the pair of the lower gears to the first output shaft,
wherein the one-way clutch is disposed between the synchronization unit and the first output shaft.

9. The transmission according to claim 1, wherein
the at least one first pair of the engine-side gears meshed with the sub-clutch and the output shaft comprises one pair of odd-numbered gears among a plurality of pairs of odd-numbered gears, except for a pair of lowest gears, and
the at least one second pair of engine-side gears meshed with the second input shaft and the output shaft comprises a plurality of pairs of even-numbered gears.

10. The transmission according to claim 1, wherein
the motor-side shift unit comprises a pair of lower gears and a pair of higher gears meshed with the third input shaft and the output shaft, and
the one-way clutch is configured to transfer power only from the pair of the lower gears in a direction to the output shaft.

11. The transmission according to claim 10, further comprising a synchronization unit configured to selectively couple an output gear of the pair of the lower gears to the output shaft,
wherein the one-way clutch is disposed between the synchronization unit and the output shaft.

* * * * *